(12) United States Patent  
Strunk

(10) Patent No.: US 6,371,420 B1
(45) Date of Patent: Apr. 16, 2002

(54) TOOTH BRUSH HOLDER

(76) Inventor: Peter Strunk, 501 Marine View Ave., DelMar, CA (US) 92014

( * ) Notice: Subject to any disclaimer, the term of this patent is extended or adjusted under 35 U.S.C. 154(b) by 0 days.

(21) Appl. No.: 09/494,094

(22) Filed: Jan. 28, 2000

(51) Int. Cl.$^7$ .............................................. A46B 17/02
(52) U.S. Cl. ..................... 248/111; 248/314; 15/105; 368/10
(58) Field of Search ................... 248/110, 111, 248/112, 113, 314; 368/10, 107; 15/167.1, 167.2, 236.08

(56) References Cited

U.S. PATENT DOCUMENTS

| 2,501,822 A | | 3/1950 | Kuyler | |
|---|---|---|---|---|
| 2,926,487 A | | 3/1960 | Stone | |
| 3,998,234 A | * | 12/1976 | Stubbmann | 132/84 R |
| 4,285,151 A | | 8/1981 | Gertler | |
| 5,044,037 A | * | 9/1991 | Brown | 15/105 |
| 5,184,959 A | | 2/1993 | Oryhon et al. | |
| 5,570,325 A | * | 10/1996 | Arpardi | 368/10 |
| 5,676,279 A | * | 10/1997 | Bastion | 222/93 |
| 5,864,288 A | * | 1/1999 | Hogan | 340/568 |
| 5,875,796 A | * | 3/1999 | Silver-Isenstadt et al. | 132/311 |
| 5,894,453 A | * | 4/1999 | Pond | 368/10 |
| 5,960,507 A | * | 10/1999 | Dutra et al. | 15/105 |
| 6,074,076 A | * | 6/2000 | Parrish-Bhagwat | 362/253 |

FOREIGN PATENT DOCUMENTS

| EP | 0032869 | * | 1/1980 |
|---|---|---|---|
| GB | 2324174 | * | 10/1998 |
| JP | 11318951 | * | 11/1999 |

* cited by examiner

Primary Examiner—Anita King
Assistant Examiner—Gwendolyn Baxter
(74) Attorney, Agent, or Firm—D. Whitlow Bivens

(57) ABSTRACT

A tooth brush holder having a housing with a receptacle therein for receiving a tooth brush. A cover is mounted for rotation about said housing. The cover has an opening in alignment with the receptacle. The housing includes facilities for closing the receptacle when the tooth brush is removed so that the user cannot replace it until a predetermined time has elapsed.

9 Claims, 2 Drawing Sheets

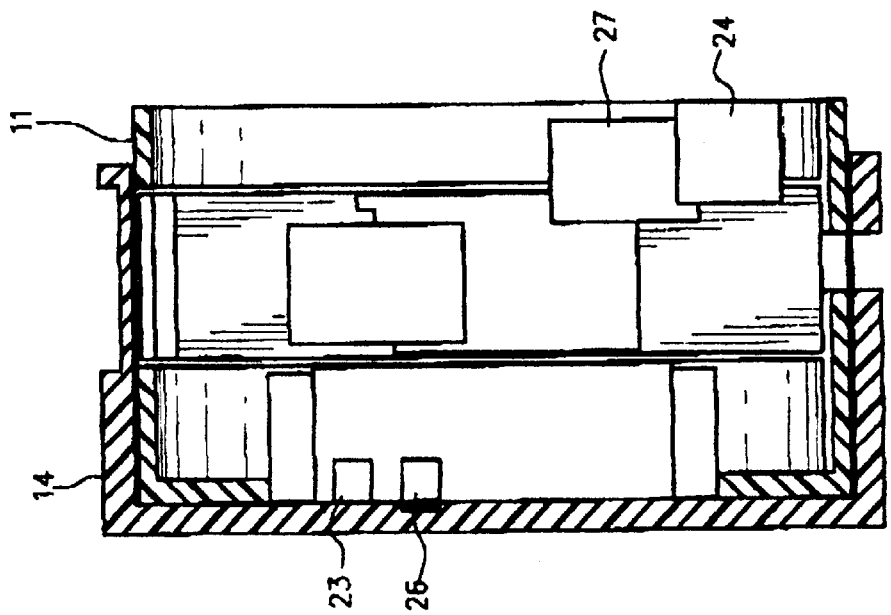
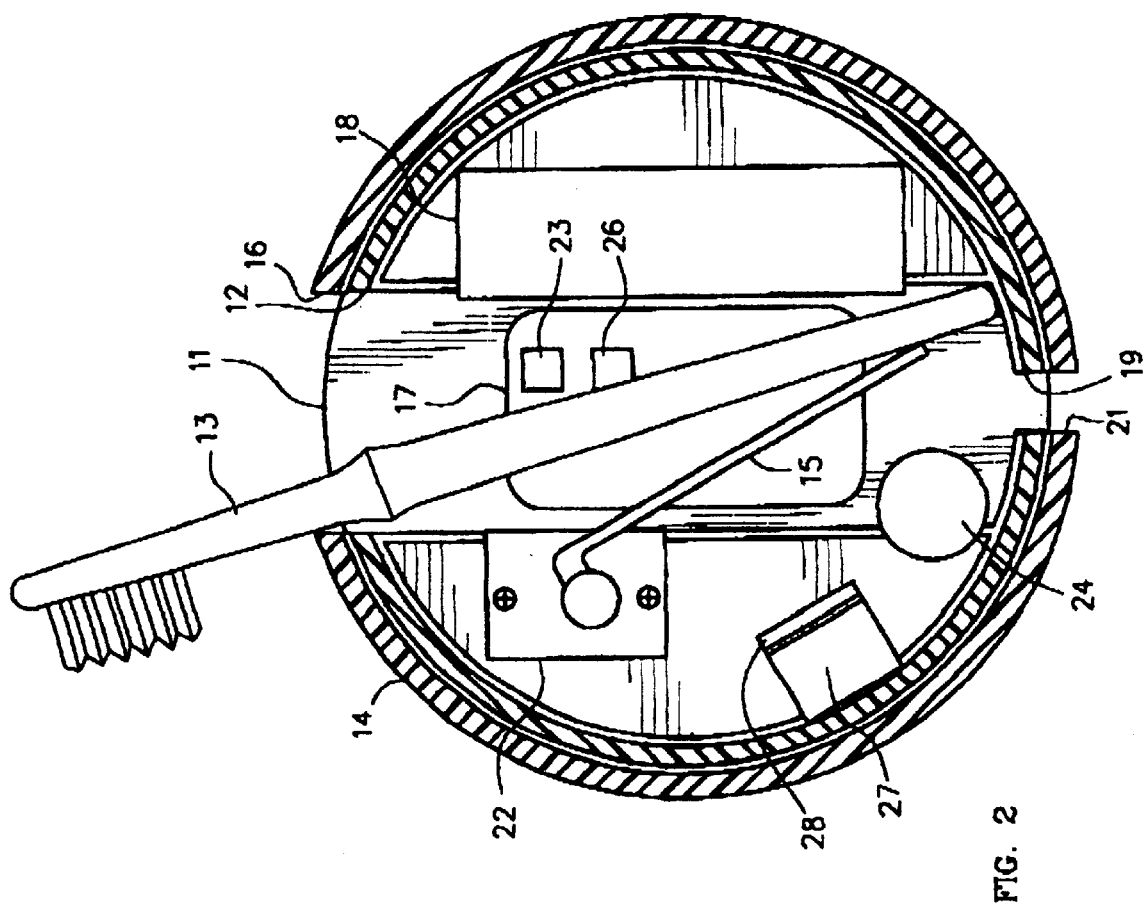

TOOTH BRUSH HOLDER

BACKGROUND OF THE INVENTION

1. Field of the Invention

This invention relates generally to a tooth brush holder, and specifically to a tooth brush holder and timer for encouraging the brushing of teeth for a predetermined period of time. The tooth brush holder and timer includes a receptacle for receiving the handle of the tooth brush and means for closing the receptacle when the tooth brush is removed, and for keeping it closed for a predetermined period of time so that the user cannot return the tooth brush to the holder until he or she has brushed for the predetermined period of time. The subject invention is useful for the improvement of dental health. It is based on three considerations. First, brushing teeth has been proven to be essential to maintain and improve dental health. Second, a substantial portion of the population practices insufficient brushing according to the standard recommended by dental health care professionals. Third, improvements in tooth brushes and tooth paste are largely ineffective if they are not used for a sufficient time. The subject invention encourages and influences the user to brush longer and more frequently achieving improved results.

2. Description of Related Art

Kuyler U.S. Pat. No. 2,501,822 discloses a tooth brush holder which when a tooth brush is removed allows music to play. The object of the invention is to encourage a child to brush his/her teeth.

Hogan U.S. Pat. No. 5,864,288 discloses a talking tooth brush holder. When a tooth brush is removed from the holder a sound producing device is activated to produce sound for a predetermined period of time. If the tooth brush is prematurely replaced a warning message or light is activated to remind the user to brush further.

Oryhon et al. U.S. Pat. No. 5,184,959 discloses a programmable tooth brush alarm unit which provides either a visual or audible alarm at a pre selected brushing time.

Arpadi U.S. Pat. No. 5,570,325 discloses a timer device for presenting an amusing visual representation of the time required for a child to brush.

None of the prior art discloses a tooth brush holder and timer wherein a tooth brush can not be replaced in the holder prior to the conclusion of a predetermined brushing time.

SUMMARY OF THE INVENTION

This invention relates to a tooth brush holder. The tooth brush holder has a housing that has a receptacle therein for receiving the handle of the tooth brush. A cover is mounted for rotation about the tooth brush holder. The cover has an opening therein in alignment with the receptacle of the tooth brush holder. The tooth brush holder has a timer and regulator therein for determining a predetermined period of time for the cover to rotate for one complete cycle. The tooth brush holder also has a switch which activates the rotation of the cover when the tooth brush is removed from the holder. The cover closes off the receptacle so that the user cannot put the tooth brush back until the predetermined time has elapsed. When the cover makes a complete circle it stops and aligns the opening in the cover with the receptacle so that the tooth brush can be replaced. The design of the invention is such that it is impossible to return the tooth brush to the holder before the predetermined time has elapsed. By keeping the holder or receptacle for the tooth brush from opening, the user thus feels obligated to continue to brush. After the predetermined period of time the tooth brush holder is opened to allow the tooth brush to be replaced into the holder. Optionally, music or visual entertainment may be provided to keep the user motivated and entertained while he or she brushes for the designated time. Alternatively, the cover could have two or three openings therein so that the user has to brush two or three times a day to make the cover rotate a full revolution.

Further aspects of the present invention will become apparent in the following detailed description when considered in conjunction with the accompanying drawings. It should be understood, however, that the detailed description and the specific examples, while representing the preferred embodiment, are given by way of illustration only.

BRIEF DESCRIPTION OF THE DRAWINGS

FIG. 2 is a cross sectional view taken along line 2—2 of FIG. 1 illustrating the inside of the holder.

FIG. 3 is a cross sectional view taken along line 3—3 of FIG. 1 illustrating the inside of the holder.

DETAILED DESCRIPTION OF THE PREFERRED EMBODIMENT

Figure 1:
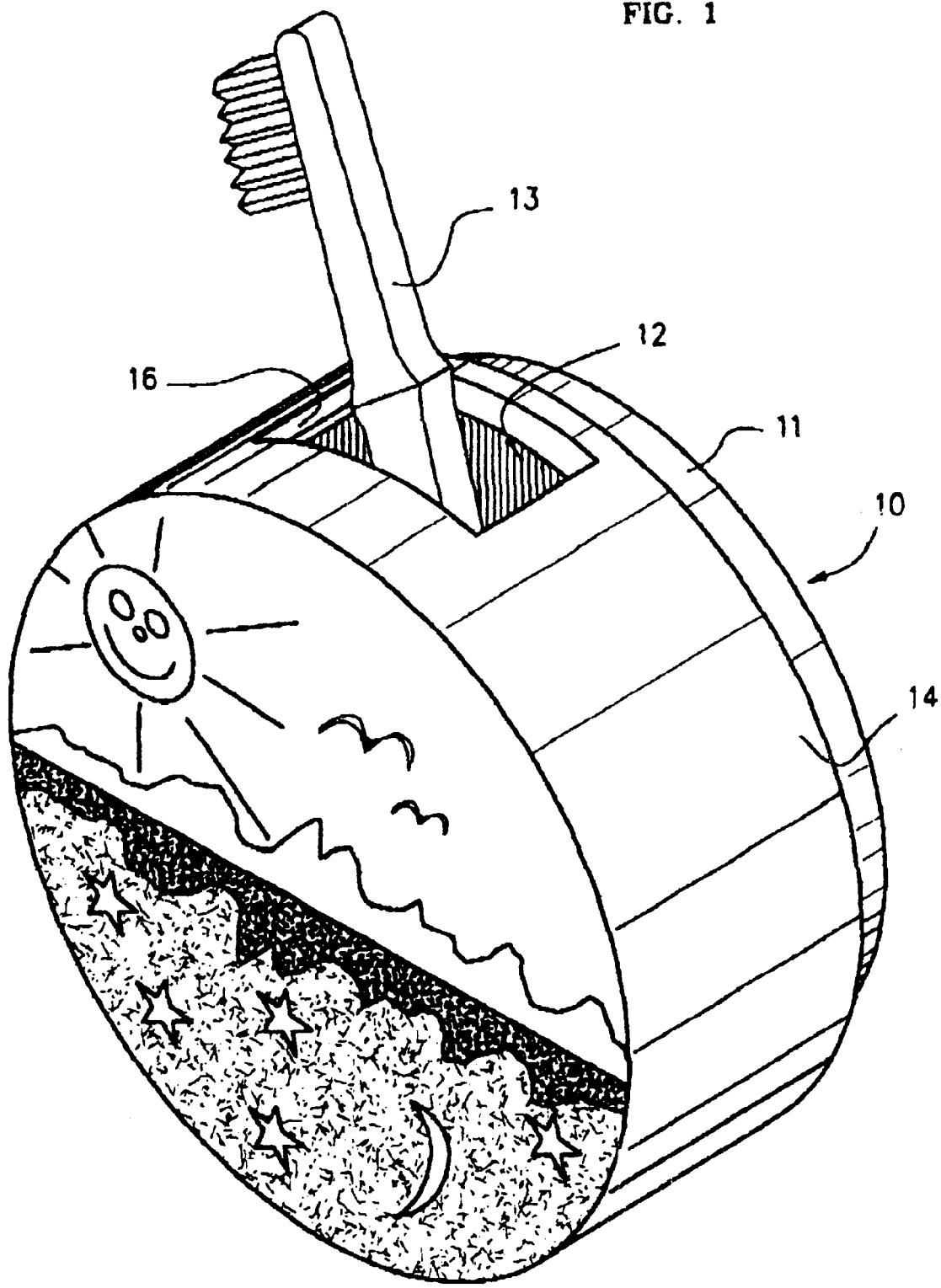
FIG. 1 is perspective view of the tooth brush holder and timer which is the subject of this invention.

The following description is of the best presently contemplated modes of carrying out the subject invention. This description is made for the purpose of illustrating the general principles of the invention and should not be taken in a limiting sense.

In accordance with the present invention, FIG. 1 shows a tooth brush holder generally designated as 10, having a housing 11 with a receptacle 12 therein for receiving a tooth brush 13. The dimensions of the receptacle 12 are such that most commonly available tooth brushes will fit whether they are long and slim or shorter and wider. A cover 14 is mounted for rotation about said housing 11. The cover 14 has an opening 16 therein which is aligned with the receptacle 12 of the housing 11.

Referring to FIGS. 2 and 3, the inside of the housing 11 is illustrated. When the tooth brush 13 is inserted into the receptacle 12 it engages the actuator 15 of a switch 22 which controls operation of a control unit 23 which includes a motor 17 powered by a battery 18. The receptacle 12 has a opening 19 at the bottom thereof which is aligned with an opening 21 in the rotatable cover 14 to allow drainage of water and toothpaste residue from the receptacle 12. The actuator 15 of the switch 22 is inside the receptacle 12 and is non corrosive so that it is not affected by moisture or tooth paste residue. The electronic portion of the switch 22 is outside the receptacle 12 and is protected from moisture.

The housing 11 also contains a regulator 24 for adjusting the rotational speed of the cover 14. The regulator 24 allows the running time of the mechanism to be adjusted to an infinitely variable adjustment or to a choice of preset times such as one minute, two minutes, or three minutes. Ideally, a typical brushing time should be within two to three minutes. A stop switch 26 is provided to stop the rotation of the cover where one full cycle is completed. If the cover 14 has additional openings as described below, the stop switch 26 will stop the rotation at 180 degrees or 120 degrees. This insures that the opening 16 in the cover 14 is aligned with the receptacle 12. The control unit 23 functions to coordinate all incoming information including signals from the switch 22, the regulator 24 and the stop switch 26. The housing 11 also may include a loud speaker 27 for playing music or other auditory sounds if desired. An optional auditory memory storage device 28 can be provided to play music or make other audible sounds to entertain the user during brushing. The cover 14 may be provided with additional openings (not shown). For example, a second opening would be in alignment with the receptacle 12 when the cover 14 rotates 180 degrees. The control unit 23 would be set so that the cover 14 stops its rotation at this point. This encourages a user to brush two times a day to get one full rotation of the cover. Similarly, the cover 14 could have three holes to encourage brushing three times a day.

Removing the tooth brush 13 from the receptacle 12 allows the actuator arm 15 to move turning the main switch 22 on. The main switch 22 signals the control unit 23 which in turn activates the motor 17. The cover 14 begins a 360 degree rotation with one cycle being the time that is preset or predetermined by adjustment of the regulator 24. Similarly, with the cover 14 having two or three openings, the cover 14 rotates 180 degrees or 120 degrees in the predetermined time. Concurrently, the optional acoustic program is started through loud speaker 27 and auditor memory 28. During the period that the cover 14 rotates it closes off the receptacle 12 so that the user may not insert the tooth brush 13. Thus, the user must continue brushing until the opening 16 in the cover 14 is again aligned with the receptacle 12.

After the predetermined time, the control unit 23 stops the cover 14 with the opening 16 in alignment with the receptacle 12. At this point, the tooth brush 13 may be replaced in the receptacle 12. When the cover 14 stops, the acoustic program is concurrently ended. When the tooth brush 13 is returned to the receptacle 12 the actuator arm 15 is moved turning the switch 22 off which transmits a signal to the control unit 23 resetting the whole mechanism. When the tooth brush 13 is removed again, the main switch initiates the cycle over again.

Referring to FIG. 1 again, the cover 14 can have a variety of designs to entertain the user or at least keep him or her occupied during brushing. The design shown includes the sun in the upper half of the design and the moon and stars below representing day and night, so that a complete revolution of the cover represents day and night. This design is typically used with a cover with two openings. When brushing in the morning the cover 14 rotates 180 degrees. When brushing in the evening the cover 14 rotates the other 180 degrees. Many other designs are possible to provide some entertaining effect or to provide an incentive to brush.

The tooth brush holder 10 is typically mounted to a bathroom wall surface by an adhesive pad not shown which may be attached to the back of the housing 11, in a way well known in the art. Alternatively, a base plate having holes therein may also be used to attach the holder 10 to the wall with fasteners.

A free standing embodiment of the subject tooth brush holder is also possible. In this embodiment, the entire holder 10 and cover 14 are adapted to be placed on a flat surface. In this freestanding embodiment, the longitudinal axis of the receptacle 12 is aligned to be parallel to the rotational axis of the cover 14. The axis of rotation of the cover is vertical. The drain in this embodiment is placed at the bottom of the receptacle to allow fluid to be removed therefrom.

Although the invention has now been described in terms of certain preferred embodiments and exemplified with respect thereto, one skilled in art can readily appreciate that various modifications, changes, omissions and substitutions may be made without departing from the spirit thereof. For example, the cover need not rotate. A sliding cover could close the receptacle during the predetermined time. It is intended therefore that the present invention be limited solely by the scope of the following claims.

What is claimed is:

1. A tooth brush holder comprising:
    a housing having a receptacle therein for receiving the handle of a tooth brush;
    a cover mounted for rotation about said housing, said cover having at least one opening therein in alignment with said receptacle for receiving the handle of the tooth brush; and
    means for rotating said cover upon removal of the tooth brush to close said receptacle for a predetermined period of time go that said tooth brush cannot be replaced until an opening is in alignment with said receptacle.

2. A tooth brush holder as set forth in claim 1 comprising:
    means for adjusting said predetermined period of time.

3. A tooth brush holder as set forth in claim 1 comprising:
    means for playing music during said predetermined period of time.

4. A tooth brush holder as set forth in claim 1 wherein said means for rotating comprises:
    means for timing the rotation of said cover.

5. A tooth brush holder as set forth in claim 4 comprising:
    means for adjusting the time of rotation of said cover.

6. A tooth brush holder as set forth in claim 1 wherein said housing is adapted to be attached to a vertical surface and an axis of rotation of the cover is horizontal.

7. A tooth brush holder as set forth in claim 1 wherein said housing is adapted to rest on a horizontal surface and an axis of rotation of the cover is vertical.

8. A tooth brush holder as set forth in claim 1 wherein said cover has two openings therein equally spaced from each other and said means for rotating comprises means for stopping said cover upon rotation of 180 degrees.

9. A tooth brush holder as set forth in claim 1 wherein said cover has at least two openings therein and said means for rotating comprises means for stopping said cover when one of said openings is aligned with said receptacle wherein the opening that is aligned with said receptacle is the opening that is next aligned with said receptacle as said cover rotates.

* * * * *